United States Patent [19]

Nakae et al.

[11] 4,203,195
[45] May 20, 1980

[54] METHOD OF PRODUCTION OF VIBRATION ABSORBING METALLIC MATERIAL

[75] Inventors: Hideo Nakae, Kashiwa; Toshinori Ozaki, Minorimachi; Kazunori Nakane, Tokaimura; Takashi Shimaguchi, Shimoinayoshi, all of Japan

[73] Assignee: Hitachi, Ltd., Japan

[21] Appl. No.: 862,623

[22] Filed: Dec. 20, 1977

[30] Foreign Application Priority Data

Oct. 21, 1977 [JP] Japan .................. 52-125739

[51] Int. Cl.² ............ B21D 39/00; B23P 11/00
[52] U.S. Cl. ......................... 29/505; 248/636
[58] Field of Search ............ 29/521, 505, 155 R; 248/20, 358 R, 358 AA, 358 A, 570, 636; 188/1 B

[56] References Cited

U.S. PATENT DOCUMENTS

| | | | |
|---|---|---|---|
| 2,009,059 | 7/1935 | Brennan et al. | 248/358 R X |
| 2,290,554 | 7/1942 | Hack | 29/505 UX |
| 2,472,767 | 6/1949 | Zetka | 29/521 X |
| 2,861,372 | 11/1958 | Hunt | 29/521 X |
| 3,161,407 | 12/1964 | Robin | 248/570 X |
| 3,713,201 | 1/1973 | Evans | 29/521 X |

FOREIGN PATENT DOCUMENTS 969893  5/1950  France ..................... 248/636

*Primary Examiner*—Charlie T. Moon
*Attorney, Agent, or Firm*—Craig & Antonelli

[57] ABSTRACT

One or a plurality of layers of a metallic raw material in plate form and one or a plurality of layers of wire netting are placed one over another in vertically stacked relation and then subjected to rolling to produce vibration absorbing metallic material. The metallic material produced in this way exhibits an excellent vibration damping performance.

5 Claims, 4 Drawing Figures

METHOD OF PRODUCTION OF VIBRATION ABSORBING METALLIC MATERIAL

LIST OF PRIOR ART REFERENCES

The following references are cited to show the state of the art:

Japanese Laying-Open of Patent application No. 50-20913 (1975) "Alloy having large underdamping ability"

Japanese Laying-Open of Patent application No. 50-71512 (1975) "Underdamping Alloy"

Japanese Laying-Open of Patent application No. 51-26676 (1976) "Vibration absorbing composite steel plate"

Japanese Laying-Open of Patent application No. 51-54820 (1976) "Cast iron having large underdamping ability"

BACKGROUND OF THE INVENTION

This invention relates to a method of production of vibration absorbing metallic material which can achieve superb effects in vibration damping when used in fabricating equipment including industrial machinery and household appliances which might raise a problem with regard to vibration and noise.

Heretofore, a Mn-Cu alloy (Japanese Laying-Open of Patent application No. 50-20913), a Ti-Ni alloy, a Fe-Cr-Al alloy (Japanese Laying-Open of Patent application No. 50-71512), Mg, a Mg-Zr alloy and graphite flake cast iron (Japanese Laying-Open Patent application No. 51-54820) have been known as metallic materials having the property of absorbing vibration. Besides these materials, vibration absorbing material in laminate form consisting of a plate made from a synthetic resinous material and metallic raw materials sandwiching the resin plate therebetween is known as shown in Japanese Laying-Open of Patent application No. 51-26676.

However, of all the aforementioned materials, the materials other than cast iron and Mg materials are not widely in use due to the fact that they are generally quite expensive. Aside from being expensive, the Mn-Cu alloy raises problems in regard to temperature characteristics and changes in quality which occur with time. In the Fe-Cr-Al alloy, a problem arises in regard to its workability.

Cast iron and Mg materials are free from the aforesaid disadvantages. However, when attempts are made to improve the vibration damping ability of these materials, it brings the defect of strength of these materials being reduced. Thus a problem is encountered in putting these materials to practical use. Also, the aforesaid material in laminate from raises problems in regard to its ability to damp vibration, namely its temperature characteristics and its workability.

SUMMARY OF THE INVENTION

An object of the present invention is to provide a method of production of vibration absorbing metallic material which exhibits an improved vibration damping performance.

Another object is to provide vibration damping metallic material which has high mechanical strength and high workability.

The outstanding characteristics of the invention are that one or a plurality of layers of wire netting woven with a fine wire are placed on one or a plurality of layers of a metallic raw material in plate form, and then the stack is subjected to rolling. One or a plurality of layers of wire netting may be superposed on one side of a layer of the metallic raw material or on both sides thereof. The layers of the wire netting may be sandwiched between two layers of the metallic raw material, and the stack may be subjected to rolling.

The vibration absorbing metallic material produced by the method according to the invention shows a superb vibration damping performance. It is reasoned that friction interfaces formed between the metallic raw material and the wire netting or within the wire netting would be responsible for the excellent vibration damping ability of the vibration absorbing metallic material according to the invention. It is thought that when the material vibrates and undergoes slight deformation, deformation stress would be absorbed by the friction interfaces with the result that the vibration is damped.

DESCRIPTION OF THE PREFERRED EMBODIMENTS

Figure 1:
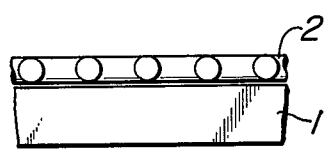
FIG. 1 is a view in explanation of the method of production of vibration absorbing metallic material comprising one embodiment of the present invention.

FIG. 1 shows one embodiment of the invention in which a layer of wire netting 2 is placed on one side of a metallic raw material 1 in plate form in superposed relation, and then rolling is carried out. By this processing, friction boundaries are formed between the raw material 1 and the wire netting 2 or within the wire netting 2.

Figure 2:
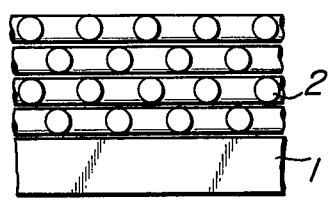
FIG. 2 is a view in explanation of the method comprising another embodiment of the invention.

In the embodiment shown in FIG. 2, four layers of wire netting 2 are placed on one side of the metallic raw material 1 in plate form in vertically stacked relation, and then rolling is carried out.

Figure 3:
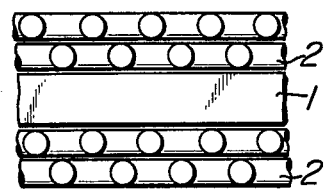
FIG. 3 is a view in explanation of the method comprising still another embodiment of the invention.

In FIG. 3, one layer of metallic raw material in plate form is sandwiched between two layers of wire netting 2 placed on one side thereof and two layers of wire netting 2 placed under the other side thereof, and then rolling is carried out.

Figure 4:
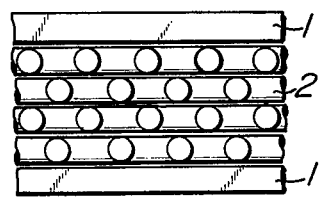
FIG. 4 is a view in explanation of the method comprising a further embodiment of the invention.

In FIG. 4, one layer of metallic raw material 1 is placed on four layers of wire netting 2 while another layer of metallic raw material 1 is placed under the four layers of wire netting 2 so as to hold the wire netting 2 between the two layers of metallic raw material 1, and then rolling is carried out.

In all the embodiments shown in FIGS. 1 to 4, one layer of metallic raw material 1 is brought into intimate contact with one layer of wire netting 2 or a plurality of layers of wire netting 2 are brought into contact with each other by rolling. By this processing, good friction interfaces are formed between the layers of metallic raw material 1 and wire netting 2, but macroscopically no diffusion joints are formed therebetween.

Generally, an increase in rolling reduction [the value expressed by (D-3.0)/D where D is the thickness of the metallic raw material in plate form] results in an increased vibration damping performance in many cases. However, this is not always the case, so that it is necessary to select a suitable rate of rolling reduction. Also, metallic material produced by placing one or a plurality of layers of wire netting 2 on a layer of metallic raw material 1 has been found to show a better vibration damping performance than metallic material produced by sandwiching wire netting 2 by two layers of raw material 1.

It has also been found that the metallic material shows a higher vibration damping performance when the resistance offered by the wire netting to deformation is greater than the resistance offered by the metallic raw material to deformation.

EXAMPLE

Plates of dimensions of 6 or 15×150×150 mm of pure aluminum and a metal of SS41 (which is an ordinary structural rolled steel so designated according to the Japanese Industrial Standards consisting of 0.18% carbon, 0.31% silicon, 0.60% manganese, 0.035% phosphorus, 0.019% sulfur and the balance iron and having tensile strength greater than 41 kg/mm$^2$) were used as raw materials, and a piece of wire netting (either of a plain woven pattern or a diamond-shaped woven pattern) woven with a wire of a diameter of 0.8 mm and having meshes of 4 mm was placed on the plate of metallic raw material as shown in FIG. 1. The wire netting was woven with a wire of zinc-plated mild steel consisting of 0.10% carbon, 0.35% silicon, 0.45% manganese, 0.031% phosphorus, 0.018% sulfur and the balance iron, or with a piano wire consisting of 0.75% carbon, 0.23% silicon, 0.48% manganese, 0.015% phosphorus, 0.017% sulfur, 0.03% copper and the balance iron. After each piece of wire netting was placed on one of the plates of metallic raw materials, rolling was carried out to reduce the thickness to 3 mm. From the products produced in this way, specimens of 3×10×150 mm were obtained, and a square metallic piece of 30 mm was welded to one end of each specimen. In measuring the ability to damp vibration, each metallic piece was gripped by a fixing jig and held in position and vibration was applied to the other end or free end thereof by using an electromagnetic force.

The table shows logarithmic decrement $\delta$ [the value expressed by $\ln(A_n/A_{n+1})$ where $A_n$ is the n-th amplitude by a vibration and $A_{n+1}$ is the n+1 th amplitude thereof] of tests performed in this way. When a piece of wire netting woven with a wire of mild steel was placed on the plate of SS41 and rolled, it was impossible to bring the wire netting into intimate contact with the plate of SS41. Thus no vibration absorbing material was obtained by this combination.

It will be seen from the following table that the vibration absorbing material according to the invention shows a vibration damping capability which is at least 100 times greater than that of the raw materials.

Table

| | | Logarithmic Decrements of Various Materials ($\delta \times 10^2$) | | | | | | | |
|---|---|---|---|---|---|---|---|---|---|
| | | Wire Netting of Plain Woven Pattern | | | | Wire Netting of Diamond-shaped Pattern | | | |
| | | Soft Steel Rolling Reduction* | | Piano Wire Rolling Reduction | | Soft Steel Rolling Reduction | | Piano Wire Rolling Reduction | |
| Raw Materials | Shape of Specimens | 50% | 80% | 50% | 80% | 50% | 80% | 50% | 80% |
| Pure Aluminum | Material of FIG. 1 | 2.3 | 1.7 | 2.5 | 2.0 | 3.1 | 2.2 | 3.4 | 2.3 |
| | Material of FIG. 2 | 12.4 | 2.8 | 13.4 | 8.8 | 15.8 | 10.5 | 17.2 | 11.5 |
| | Material of FIG. 3 | 18.7 | 3.9 | 21.9 | 10.1 | 23.2 | 13.6 | 23.6 | 14.4 |
| | Material of FIG. 4 | 8.1 | 2.6 | 10.0 | 7.6 | 11.7 | 9.7 | 12.4 | 10.8 |
| SS41 | Material of FIG. 1 | — | — | 2.3 | 1.5 | — | — | 3.2 | 2.0 |
| | Material of FIG. 2 | — | — | 11.1 | 7.7 | — | — | 16.8 | 11.4 |
| | Material of FIG. 3 | — | — | 15.6 | 9.0 | — | — | 21.5 | 13.9 |
| | Material of FIG. 4 | — | — | 7.5 | 5.3 | — | — | 12.3 | 10.1 |

*The value expressed by (D−3.0)/D where D is the thickness of the plate of metallic raw material.

We claim:

1. A method of production of vibration absorbing metallic material comprising the steps of:
   placing at least one layer of wire netting over at least one layer of a metallic raw material in plate form in vertically stacked relation, wherein said metallic raw material is an ordinary structural rolled steel; and
   subjecting the stack of wire netting and metallic raw material to rolling, thereby forming friction interfaces between said metallic raw material and said wire netting or within the wire netting, whereby a vibration absorbing material having a vibration damping capacity larger than said metallic raw material is formed.

2. A method as set forth in claim 1, wherein said wire netting is woven with a soft steel.

3. A method as set forth in claim 1, wherein said wire netting is woven with a piano wire.

4. A method as set forth in claim 1, wherein a plurality of layers of wire netting is placed over said at least one layer of metallic material.

5. A method as set forth in claim 1, wherein the resistance to deformation of the wire netting is greater than the resistance to deformation of the metallic raw material.

* * * * *